United States Patent Office 3,522,257
Patented July 28, 1970

3,522,257
TETRAZAPENTACENE DYESTUFFS
Christian Zickendraht, Binningen, and Dieter Maeusezahl, Allschwil, Switzerland, assignors to Ciba Limited, Basel, Switzerland, a company of Switzerland
No Drawing. Filed Jan. 29, 1968, Ser. No. 701,073
Claims priority, application Switzerland, Feb. 28, 1967, 2,951/67
Int. Cl. C07d 51/80
U.S. Cl. 260—250
5 Claims

ABSTRACT OF THE DISCLOSURE

The invention concerns new tetrazapentacenes which have brilliant red colors in acetylcellulose and polyacylnitrile; they correspond to the formula

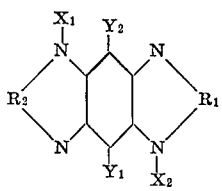

in which $R_1$ and $R_2$ each represents an ortho-arylene group containing a sulphone group, or a sulphonic acid ester or amide group, $Y_1$ and $Y_2$ each represents a halogen atom or an acylamino group and $X_1$ and $X_2$ each represents an aryl, aralkyl, cycloalkyl or unsubstituted or substituted alkyl radical.

---

The present invention is based on the observation that valuable, new tetrazapentacenes of the formula (1)

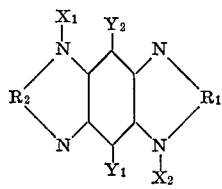

in which $R_1$ and $R_2$ each represents an ortho-arylene group containing a sulphone group, or a sulphonic acid ester or amide group, $Y_1$ and $Y_2$ each represents a halogen atom or an acylamino group and $X_1$ and $X_2$ each represents an aryl, aralkyl, cycloalkyl or unsubstituted or substituted alkyl radical, can be obtained when a 2,3,5,6-tetrahalogeno-1,4-benzoquinone or a 2,5-dihalogeno-3,6-diacylamino-1,4-benzoquinone is reacted with a diamine of the formula (2)

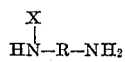

in which X represents an aryl, aralkyl, cycloalkyl or unsubstituted or substituted alkyl radical and R represents an aryl radical that carries the $NH_2$ and the X—NH— group in vicinal positions relative to each other and further contains a sulphone group, or a sulphonic acid ester or amide group.

The process of this invention which provides dyestuffs of the above general Formula 1 may be advantageously carried out in an organic medium, for example in an alcohol for example ethanol or amyl alcohol, or in an ester for example ethyl acetate, in methylethylketone, carbon tetrachloride, mono- or dichlorobenzene or the like, if desired or required with heating. It is advantageous to reflux, for example for 2 to 12 hours, at the boiling temperature of the reaction mixture which preferably further contains an acid acceptor, especially potassium or sodium acetate, and if desired also copper powder, or under superatmospheric pressure.

As examples of benzoquinones of the kind defined above which may be used as starting materials the following may be mentioned: 2,3,5,6-tetrachloro- or -tetrabromo-1,4-benzoquinone, 2,5-diacetylamino-3,6-dichloro-1,4-benzoquinone, 2,5-diisopropylamino-3,6-dichloro-1,4-benzoquinone, 2,5-dibenzoylamino - 3,6 - dichloro-1,4-benzoquinone, 2,5-di-(p-chlorobenzoylamino) - 3,6 - dichloro-1,4-benzoquinone, 2,5-diethenoylamino - 3,6 - dichloro-1,4-benzoquinone, 2,5-dimethanesulphonylamino-3,6-dichloro-1,4-benzoquinone and 2,5-bis-ureido-3,6-dichloro-1,4-benzoquinone.

The diamines of the above Formula 2 which are also used as starting materials may be diamines of the naphthalene or preferably of the benzene series that contain a sulphone group, for example an alkyl-, aralkyl- or aryl-sulphone group, or a sulphonic acid ester group, for example a group —$SO_2$—OZ (in which Z represents an alkyl or preferably an aryl group). They advantageously contain a sulphonamido group in which the amide nitrogen atom may carry alkyl, cycloalkyl, aralkyl or aryl substituents or may be a member of a heterocycle. These diamines are preferably free from acidic groups, for example sulphonic acid and carboxyl groups, or they may contain further substituents of a non-ionic nature. One of the two amino groups carries an unsubstituted or substituted alkyl, aralkyl or aryl group, while the other is a primary amino group.

As examples of such diamines the following may be mentioned:
1-methylamino-2-aminobenzene-4-sulphonamide,
1-ethylamino-2-aminobenzene-4-sulphonic acid-N-methylamide,
1-n-butylamino-2-aminobenzene-4-sulphonic acid-N,β-hydroxyethylamide,
1-n-butylamino-2-aminobenzene-4-sulphonic acid-N,γ-methoxypropylamide,
1-n-butylamino-2-aminobenzene-4-sulphonic acid-N,β-methoxyethylamide,
1-n-butylamino-2-aminobenzene-4-sulphonic acid-N,γ-isopropoxypropylamide,
1-n-butylamino-2-aminobenzene-4-sulphonic acid-N-phenylamide,
1-n-butylamino-2-aminobenzene-4-sulphonic acid-N-cyclohexylamide,
1-n-butylamino-2-aminobenzene-4-sulphonic acid-N-methyl-N-phenylamide,
1-n-butylamino-2-aminobenzene-4-sulphonic acid-N-carboxyphenylamide,
1-γ-methoxy- or 1-γ-isopropoxypropylamino-2-aminobenzene-4-sulphonic acid-N-methylamide, -isopropoxypropylamide, -n-butyl-amide, -cyclohexylamide or -phenylamide,
1-phenylamino-2-aminobenzene-4-sulphonic acid-N,2-ethylhexylamide, -N-methyl-N-phenylamide or -N-cyclohexylamide,
1-methylamino- or 1-ethylamino-2-aminobenzene-4-sulphonic acid morpholide or piperidide, 1-methyl- or 1-n-butylaminobenzene-4-sulphonic acid phenyl or tolyl ester, and 4-methanesulphonyl-, 4-ethanesulphonyl, 4-butanesulphonyl- or 4-benzenesulphonyl-2-amino-1-methyl-aminobenzene or -propylaminobenzene and the like.

These diamines may be obtained by reducing the corresponding 1-alkyl- or 1-arylamino-2-nitro derivatives (which themselves are prepared by reacting 1-chloro-2-nitrobenzenesulphones or sulphonic acid esters or sulphonamides with alkylamines or arylamines) for example, with Raney nickel, sodium-aluminium hydride, sodium amalgam or preferably with iron and hydrochloric acid.

The products obtained according to the process of the invention are valuable, generally red, dyestuffs which may be used, for example, as pigments in a wide variety of processes, for example in a finely divided form for dyeing synthetic rayon and viscose rayon or cellulose ethers and esters, or polyamides, polyurethanes or polyesters in the spinning mass. They may also be used for the manufacture of coloured lacquers or lake formers, and for colouring solutions and products prepared from acetylcellulose, nitrocellulose, natural resins or synthetic resins for example polymerization or condensation resins, for example aminoplasts, alkyd resins, phenoplasts, polyolefines for example polystyrene, polyvinylchloride, polyethylene, polypropylene, polyacrylonitrile, rubber, casein, silicone and silicone resins. Furthermore, they may be used with advantage in the manufacture of coloured pencils, cosmetic preparations or laminated panels.

The dyestuffs obtained by the present process are soluble in organic solvents, for example esters and especially in alcohol and acetone; they may be used for colouring natural or synthetic resins, waxes, lacquers and plastic masses, for example of cellulose ethers or esters, for example for spin dyeing acetate rayon and for colouring natural or synthetic polymers or condensation products.

When, for example, acetate rayon is dyed by the spin dyeing method with the dyestuffs of this invention, clear shades are obtained which are fast to cross-dyeing, chlorine and gassing.

In general, the resulting dyeings are very fast to migration and have excellent wet fastness properties. The fastness to cross-dyeing of the dyeings on acetate rayon is remarkable. A particularly striking feature is the astonishing covering power and the purity and vividness of the shades produced with the new dyestuffs.

Compared with known fluorindine derivatives as described for instance in vol. 23 of the Berichte de deutschen chemischen Gesellschaft, p. 2791 and vol. 26, p. 382 as well as in the Journal of the Chemical Society, p. 1180 [1926], the new dyestuffs of the present invention have the advantage that they are much more stable towards alkalies and acids.

Unless otherwise indicated, parts and percentages in the following examples are by weight.

EXAMPLE 1

A mixture of 65 parts of 1-butylamino-2-aminobenzene-4-isopropoxypropylsulphonamide [prepared by reacting 1 - chloro - 2-nitrobenzene-4-isopropoxypropylsulphonamide with butylamine and reducing the nitro compound], 25 parts of 2,3,5,6-tetra-chloro-1,4-benzoquinone and 16 parts of anhydrous sodium acetate in 300 parts of ethanol is refluxed for 3 hours while stirring allowed to cool and the dyestuff, which forms fine crystals, is filtered and dried. It is soluble in acetone and dyes acetate rayon in the mass brilliant bluish red shades having excellent wet fastness properties.

Similar bluish red dyestuffs are obtained by the process described above by condensing the bases shown in column I of the following table with 2,3,5,6-tetrachloro-1,4-benzoquinone. The constitution of the corresponding dyestuffs thus obtained is shown in column II.

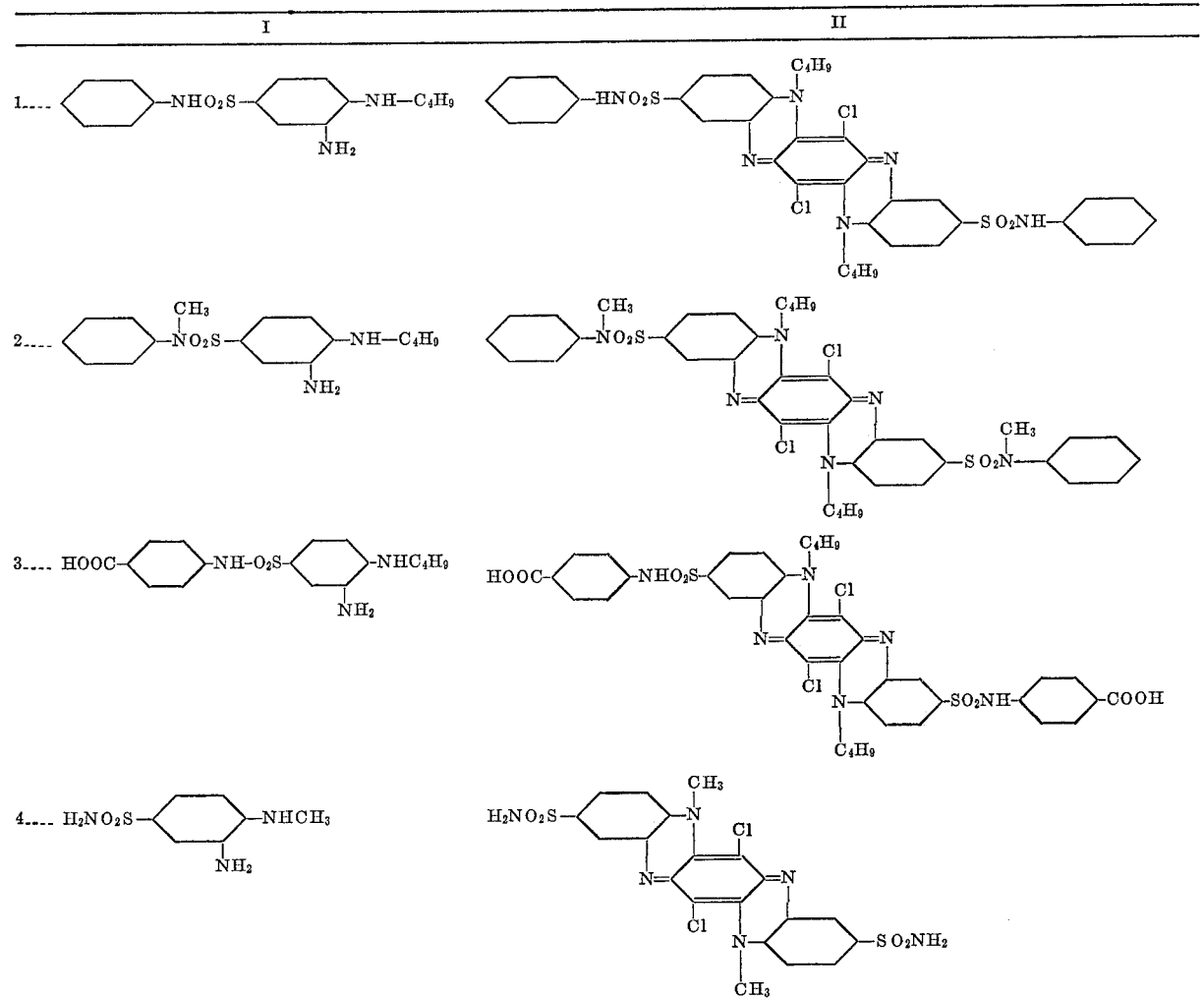

TABLE—Continued

| I | II |
|---|---|
| 5.... 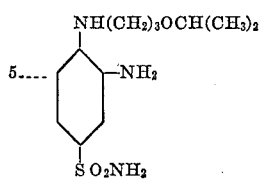 | 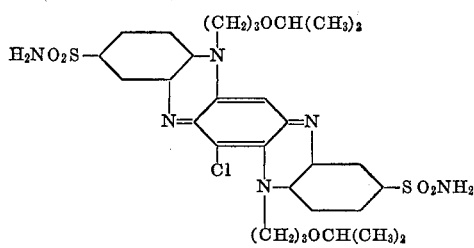 |
| 6.... 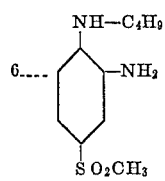 | 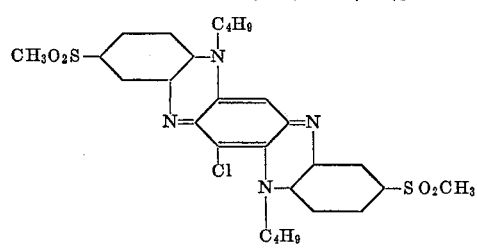 |

EXAMPLE 2

A suspension of 34 parts of 1-butylamino-2-amino-benzene - 4 - isopropoxypropylsulphonamide, 15 parts of 2,5 - diacetylamino - 3,6-dichloro-1,4-benzoquinone, 8.2 parts of anhydrous sodium acetate and 0.5 part of copper powder in 300 parts of amyl alcohol is stirred for 6 hours at 110 to 120° C., filtered and the solvent distilled in steam. The dried residue is a dyestuff which gives a violet-red solution in acetone and dyes an acetate rayon spinning mass brilliant violet-red shades.

When the sulphonamide base mentioned above is replaced by 36 parts of 1-phenylamino-2-aminobenzene-4-isopropoxypropyl - sulphonamide, all other conditions being identical, the dyestuff of the formula

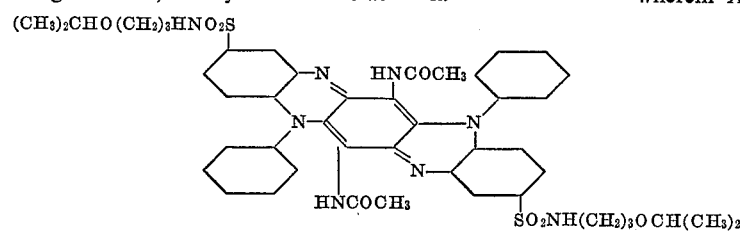

is obtained which dyes an acetate rayon spinning mass bluish red shades that are fast to wetting.

What is claimed is:
1. A dyestuff of the formula

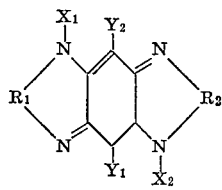

wherein $R_1$ and $R_2$ are each selected from the group consisting of benzene bound in the ortho-position to the two vicinal nitrogen atoms and containing substituents selected from the group consisting of lower alkyl-sulphone containing up to 4 carbon atoms, sulphonamide and substituted sulphonamide wherein the substituent is selected from the group consisting of alkyl containing up to 8 carbon atoms, alkoxyalkyl containing up to 6 carbon atoms, phenyl, carboxy-phenyl, sulphonic acid phenyl ester, sulphonic acid tolyl ester, morpholido, piperidino, and benzene sulphonyl; $Y_1$ and $Y_2$ are each selected from the group consisting of halogen, acetylamino, propionylamino, benzoylamino and para-chlorobenzoylamino; and $X_1$ and $X_2$ are each selected from the group consisting of lower alkyl containing up to 4 carbon atoms, alkoxyalkyl containing up to 6 carbon atoms and phenyl.

2. A dyestuff as claimed in claim 1, wherein $Y_1$ and $Y_2$ each represents a chlorine atom.

3. A dyestuff as claimed in claim 1, which corresponds to the formula

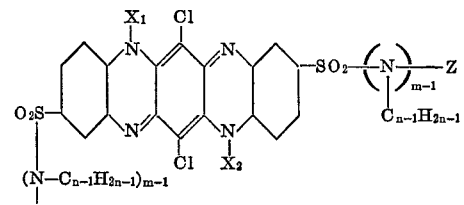

wherein $X_1$ and $X_2$ are each selected from the group consisting of alkyl containing up to 4 carbon atoms, alkoxyalkyl containing up to 6 carbon atoms and phenyl; $n$ and $m$ are each an integer of from 1–2; and Z is selected from the group consisting of alkyl containing up to 4 carbon atoms and phenyl.

4. A dyestuff as claimed in claim 1, which corresponds to the formula

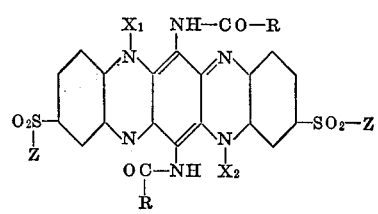

wherein R is selected from the group consisting of methyl and phenyl; Z is selected from the group consisting of amino, mono- and di-substituted amino wherein the substituents are selected from the group consisting of alkyl containing up to 8 carbon atom, alkoxyalkyl containing up to 6 carbon atoms and phenyl; and $X_1$ and $X_2$ are each selected from the group consisting of alkyl containing up to 4 carbon atoms and phenyl.

5. A dyestuff as claimed in claim 1, which corresponds to the given formula, in which $Y_1$ and $Y_2$ each represent a chlorine atom and $R_1$ and $R_2$ are each selected from the group consisting of substituted benzene, which benzene is bound in the ortho-position to the two vicinal nitrogen atoms and the substituent is in the para-position to the

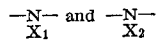

bridges and is selected from the group consisting of sulphonamide-N-isopropoxypropyl when $X_1$ and $X_2$ are each phenyl, and sulphonamide when $X_1$ and $X_2$ are each methyl.

References Cited
FOREIGN PATENTS 988,331  4/1964  Great Britain.

NICHOLAS S. RIZZO, Primary Examiner

U.S. Cl. X.R.

8—4, 21, 24, 162, 177, 180; 260—37, 247.1